(12) United States Patent
Anderson et al.

(10) Patent No.: US 7,742,862 B2
(45) Date of Patent: Jun. 22, 2010

(54) METHOD AND SYSTEM FOR ESTIMATING AN AGRICULTURAL MANAGEMENT PARAMETER

(75) Inventors: Noel Wayne Anderson, Fargo, ND (US); Arnold Albert Taube, Geneseo, IL (US)

(73) Assignee: Deere & Company, Moline, IL (US)

( * ) Notice: Subject to any disclaimer, the term of this patent is extended or adjusted under 35 U.S.C. 154(b) by 500 days.

(21) Appl. No.: 11/650,121

(22) Filed: Jan. 5, 2007

(65) Prior Publication Data
US 2009/0005990 A1 Jan. 1, 2009

Related U.S. Application Data

(62) Division of application No. 10/913,192, filed on Aug. 6, 2004, now abandoned.

(51) Int. Cl.
G06F 7/70 (2006.01)
(52) U.S. Cl. .............................. 701/50; 700/284; 702/2
(58) Field of Classification Search ..................... 701/1, 701/50; 702/1, 2; 700/284; 405/36, 37; 137/78.1–78.3; 47/1.01, 58.1
See application file for complete search history.

(56) References Cited

U.S. PATENT DOCUMENTS

| | | | |
|---|---|---|---|
| 4,755,942 A * | 7/1988 | Gardner et al. ............... 700/284 |
| 4,876,647 A | 10/1989 | Gardner et al. |
| 5,539,637 A | 7/1996 | Upchurch et al. |
| 5,612,882 A | 3/1997 | LeFebvre et al. |
| 5,696,671 A | 12/1997 | Oliver |
| 5,771,169 A | 6/1998 | Wendte |
| 5,884,224 A | 3/1999 | McNabb et al. |
| 6,108,590 A * | 8/2000 | Hergert ...................... 700/284 |
| 6,128,574 A | 10/2000 | Diekhans |
| 6,298,285 B1 * | 10/2001 | Addink et al. ............... 700/284 |
| 6,397,162 B1 | 5/2002 | Ton |
| 6,505,146 B1 * | 1/2003 | Blackmer .................... 702/189 |
| 6,535,141 B1 | 3/2003 | Doherty |
| 6,580,984 B2 | 6/2003 | Fecher et al. |
| 6,597,992 B2 | 7/2003 | Rooney et al. |
| 6,604,023 B1 * | 8/2003 | Brown et al. ................ 700/276 |
| 6,657,410 B1 | 12/2003 | Berger et al. |
| 6,820,009 B2 | 11/2004 | Sommer |
| 6,937,939 B1 * | 8/2005 | Shibusawa et al. ............ 702/22 |
| 6,977,597 B2 * | 12/2005 | Doherty ....................... 340/905 |
| 6,990,459 B2 * | 1/2006 | Schneider ....................... 705/8 |
| 7,048,204 B1 * | 5/2006 | Addink et al. ................. 239/63 |

(Continued)

FOREIGN PATENT DOCUMENTS

JP 11272986 10/1999

*Primary Examiner*—Mark Hellner
*Assistant Examiner*—Helal A Algahaim
(74) *Attorney, Agent, or Firm*—Yee & Associates, P.C.; Marilyn Smith Dawkins

(57) ABSTRACT

A system and method for estimating agricultural parameters for growing crops is well suited for promoting efficient utilization of agricultural inputs (e.g., water consumption). Sensors collect data via one or more vehicles equipped with location-determining receivers. A transmitter transmits the collected environmental data to a data processing system. The data processing system applies the collected environmental data to an agronomic model for determining an agricultural management parameter. A prescription is made available for application of an agricultural input (e.g., water) to a crop in a particular location consistent with the collected environmental data and the agronomic model.

13 Claims, 6 Drawing Sheets

U.S. PATENT DOCUMENTS

| | | | |
|---|---|---|---|
| 7,167,797 B2 * | 1/2007 | Faivre et al. | 701/214 |
| 7,216,020 B2 * | 5/2007 | Marian | 700/284 |
| 7,231,298 B2 * | 6/2007 | Hnilica-Maxwell | 702/3 |
| 7,254,485 B2 * | 8/2007 | Rooney et al. | 702/5 |
| 7,313,478 B1 * | 12/2007 | Anderson et al. | 702/2 |
| 7,469,707 B2 * | 12/2008 | Anderson et al. | 137/78.3 |
| 2002/0010516 A1 | 1/2002 | Addink et al. | |
| 2003/0109964 A1 * | 6/2003 | Addink et al. | 700/284 |
| 2008/0140431 A1 * | 6/2008 | Anderson et al. | 705/1 |

\* cited by examiner

Fig. 7A {
COLLECTED DATA
  VEHICLE IDENTIFIER
  VEHICLE LOCATION DATA
  VEHICLE VELOCITY DATA
  VEHICLE HEADING DATA
  TIME STAMP
  TEMPERATURE DATA
  HUMIDITY DATA
  SOLAR RADIATION DATA (E.G., SOLAR INTENSITY VS. TIME DATA)
  PRECIPITATION DATA
  WIND DATA

Fig. 7B {
GROWER INPUT DATA
  GROWER IDENTIFIER
  GROWER LOCATION DATA
  CROP IDENTIFIER
  PLANTING DATE
  PRESENT DATE
  IRRIGATION EQUIPMENT SPECIFICATIONS (OPTIONAL)

Fig. 7C {
PRESCRIPTION DATA
  WATER REQUIREMENT DATA
  IRRIGATION EQUIPMENT SETTINGS (OPTIONAL)
  DATE OF PRESCRIPTION
  TIME WINDOW FOR FULFILLING PRESCRIPTION

METHOD AND SYSTEM FOR ESTIMATING AN AGRICULTURAL MANAGEMENT PARAMETER

This is a divisional of application Ser. No. 10/913,192 and filed Aug. 6, 2004 now abandoned.

FIELD OF THE INVENTION

This invention relates to a method and system for estimating one or more agricultural management parameters.

BACKGROUND OF THE INVENTION

Stationary weather stations or other agronomic sensing stations may be positioned in a field to determine environmental parameters for raising agricultural crops. However, the cost, maintenance, and other drawbacks of stationary weather stations discourage the wide-spread deployment of such agronomic sensing stations. Batteries of sensing stations may need to be replaced or recharged periodically. Sensing stations may be vulnerable to theft or vandalism. The placement of sensing stations in the field can make them susceptible to collisions or entanglement with machinery, tractors or implements, for example.

The success of growers depends upon an adequate supply of water (e.g., rainfall) and other agricultural inputs for raising crops. The cost of providing irrigation or other agricultural inputs to crops is based on the quantity, frequency and rate of application of the agricultural input to a field. Accordingly, there is need for providing low cost and accurate agricultural management parameters to growers to reduce or optimally allocate agricultural inputs (e.g., water consumption and irrigation expenses) to the extent practical.

SUMMARY OF THE INVENTION

A system and method for estimating one or more agricultural management parameters for growing crops is well suited for promoting efficient utilization (e.g., water consumption) of an agricultural input. One or more vehicles are equipped with sensors and location-determining receivers. The sensors collect environmental data associated with a field for growing a crop in a particular location. The location-determining receiver facilitates referencing one or more sensor-measurement locations (e.g., points on a transportation route of the vehicle where environmental data is measured) to the particular location. A transmitter transmits the collected environmental data to a data processing system. The data processing system applies the collected environmental data to an agronomic model for estimating an agricultural management parameter (e.g., demand or requirement for irrigation). A prescription is made available for application of an agricultural input (e.g., water) to a crop in the particular location consistent with the collected environmental data and the agronomic model.

BRIEF DESCRIPTION OF THE DRAWINGS

FIG. 7A is a diagram of an illustrative data structure or list of data fields for collected environmental data.

FIG. 7B is a diagram of an illustrative data structure or list of data fields for grower input data.

FIG. 7C is a diagram of an illustrative data structure or list of data fields for prescription data.

DESCRIPTION OF THE PREFERRED EMBODIMENT

Figure 1:
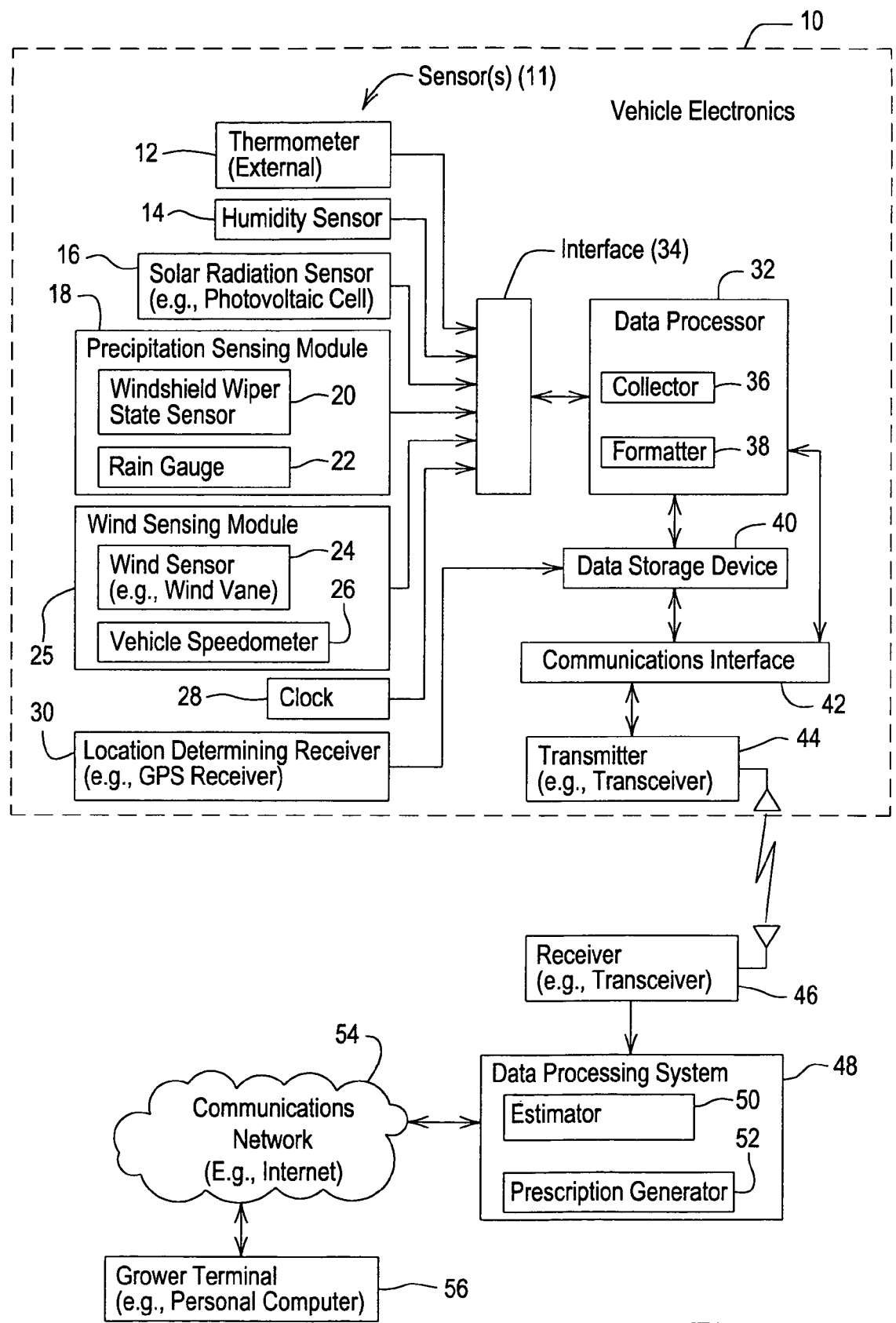
FIG. 1 is a block diagram of one embodiment of a system for estimating an agricultural management parameter in accordance with the invention.

In FIG. 1, a system for estimating one or more agricultural management parameters comprises vehicle electronics 10 for collecting environmental data associated with respective location data. Environmental data may comprise weather data, climatic data and precursor data to the weather data and climatic data. The environmental data further comprises location data (e.g., location stamps, expressed in geographic coordinates) and temporal data (e.g., time stamps) associated with the weather data, climatic data and precursor data. The location data may correspond to one or more sensor measurement locations or points along a path or resting location of a vehicle (incorporating the vehicle electronics 10) on a transportation route that bisects, adjoins, or lies near or in a field where a particular crop is grown by a grower. The vehicle electronics 10 communicates the collected environmental data to a receiver 46 via an electromagnetic signal (e.g., a radio frequency signal). In turn, the receiver 46 supplies the collected environmental data to a data processing system 48 for estimating one or more agricultural management parameters (or environmental parameters) based on the collected environmental data. The agricultural management parameters may define an agronomic state of a corresponding field associated with location data. The environmental parameters may relate to statistically winnowed (e.g., filtered to attain an acceptable level of reliability) weather data associated with the field at a corresponding particular location within a geographic area.

A grower terminal 56 is arranged to communicate with the data processing system 48 via a communications network 54 (e.g., the Internet). The grower may provide supplemental data to the data processing system 48. The supplemental data may comprise any data that is available to the grower. For example, supplemental data may include information on the quantity, date, date of application, location data for application or distribution of an agricultural input; weather data from governmental or commercially available sources; soil data, soil test data versus location data, soil profile data from soil surveys that are publicly available; and information on the crop planted, the planting data, the seed variety and genetic make-up. The data processing system 48 uses the collected environmental data (or the estimated agricultural parameters therefrom) and the supplemental data to generate a prescription for the grower. The prescription may mean a recommendation concerning an agricultural input or treatment of a crop associated with a particular field or particular location data. For instance, the prescription may provide an identifier of an agricultural input, a concentration off the agricultural input, a quantity or rate of application of the agricultural input, date of application or time window for application of the agricultural input. An agricultural input means water, seed, fertilizer, nitrogen, potassium, phosphorus, plant nutrients, trace minerals, chemicals, fungicide, herbicide, pesticide, and any other material suitable for application to crops or a field.

In general, the vehicle electronics 10 comprises sensors 11 that are arranged to input collected environmental data to a data processor 32. The sensors 11 include two or more of the following items: thermometer 12 (e.g., for external or ambient temperature around the vehicle), pyrometer, humidity sensor 14, dew point temperature sensor, solar radiation sensor 16 (e.g., photovoltaic cell), windshield wiper state sensor 20, precipitation module 18, rain gauge 22, wind sensor 24 (e.g., wind vane), wind sensing module 25, vehicle speed, clock 28, air-conditioning load sensor (e.g., an ammeter for an electrically driven compressor), and location-determining receiver 30 (e.g., GPS receiver).

The sensors 11 collect data along the path of travel (e.g., transportation route or road) of a corresponding vehicle. The path of travel may be planned such that sensor measurement points of the sensors 11 are spatially near a particular field or farm land in a certain region. However, the path of travel need not be planned and may be incidental to other tasks of the driver or operator (e.g., law enforcement or police patrols for a squad car equipped with vehicle electronics). The collected environmental data is associated with a location-determining receiver 30 for gathering location data and a corresponding temporal data (e.g., clock data) for time-stamping the gathered location data. The collected environmental data refers one or more of the following: to sensor data, clock data and location data.

The interface 34 is an intermediary between the sensors 11 and the data processor 32. The interface 34 may provide one or more of the following: (a) an analog-to-digital converter for converting an analog sensor signal into a corresponding digital sensor signal, (b) storing environmental data in a buffer memory prior to other processing by the data processor 32, (c) pre-processing (e.g., averaging of the sampled data or measurements over time) of the digital sensor signal to reduce the requisite computational throughput capacity of the data processor 32, (d) derivation of environmental data from precursor data determined by the sensors 11.

In one embodiment, data processor 32 comprises a collector 36 and a formatter 38. The collector 36 facilitates collection of the environmental data and organization of the environmental data, including tracking of the number of samples during a given time period for any defined geographic area. The collector 36 may include a statistical analyzer for performing statistical analysis on the environmental data consistent with the tracked samples per defined geographic area. The formatter 38 may place the environmental data into a desired standard data format for storage in the data storage device 40 or transmission via a communications interface 42 and the transmitter 44. The data storage device 40 may comprise nonvolatile memory or a hard-disk drive, for example. The data processor 32 may comprise an embedded processor, a digital signal processor, a microprocessor, a computer, or any other data processor. The interconnections between the data processor 32 and other components (e.g., the interface 34, data storage device 40, and communications interface 42) indicated by arrows may represent physical data paths (e.g., a databus), logical data paths, or both.

Although other configurations are possible, in one illustrative embodiment (a) the data processor comprises a central processing unit (not shown) coupled to the interface 34 via a databus, (b) the interface 34 comprises an input/out port (e.g., a synchronous or asynchronous data port) that communicates with the central processing unit via the databus and the sensors 11 via a cable, wireless communications link or other connection, and (c) the collector 36 and formatter 38 represent software programs, routines, or instructions associated with or resident in the data processor or central processing unit.

In an alternate embodiment, the data processor 32 further comprises a data derivation unit for deriving one or more of the following collected environmental data from the precursor data items: climatic data, temperature data, dew point temperature, relative humidity, wind speed, solar radiation, sunlight intensity, wind direction, and rainfall amounts.

The communications interface 42 may provide management of the transmission of data, including temporary storage of collected environmental data (e.g., buffer memory), error detection and correction, or other data processing (e.g., data packetization).

The transmitter 44 transmits the collected environmental data to a data processing system 48. In one embodiment, the transmitter 44 comprises at least one of a Bluetooth transmitter, a spread spectrum transmitter, a code division multiple access transmitter, an infra-red transmitter, and a radio frequency transmitter.

In the embodiment as shown in FIG. 1, the data processing system 48 comprises an estimator 50 and a prescription generator 52. The estimator 50 applies the collected environmental data to an agronomic model for determining an agricultural management parameter (e.g., on water or irrigation management, an agricultural parameter or both). The prescription generator 52 makes available a prescription for application of the agricultural input (e.g., water) to a crop in a particular location consistent with the collected environmental data and the agronomic model.

Now that an overview of the system of FIG. 1 has been provided, the location-determining receiver 30, clock 28, and sensors 11, of FIG. 1 are described in greater detail. In one embodiment, the location-determining receiver 30 provides location data (e.g., geographic coordinates of the location-determining receiver 30 mounted on the vehicle). Further, the location-determining receiver 30 may be configured to provide heading data, velocity data, and time data. The speed data (e.g., from a speedometer 26) may supersede, supplement, or complement (e.g., provide an error check against) the velocity data provided by the location-determining receiver 30. In one embodiment, the location-determining receiver 30 comprises a Global Positioning System (GPS) receiver (e.g., with differential correction).

The wind sensor 24 provides an estimated speed of the wind, direction of the wind, or both. If the vehicle is moving when the wind sensor 24 takes a measurement, the wind sensor reading needs to be compensated for the motion of the vehicle to facilitate accurate estimation of the wind speed. Velocity data may be gathered from one or more of the following: the location-determining receiver 30, a speedometer 26, an accelerometer, a compass, and vehicle steering wheel position sensors. The velocity data includes a vehicle speed component and a heading component. The velocity data (e.g., as vector data) may be applied to determine the relative velocity of the of the wind (as vector data) with respect to the ground or a stationary vehicle, rather than with respect to the moving vehicle.

The windshield wiper state sensor 20 may support one or more of the following: windshield wiper off and vehicle on; windshield wiper on and vehicle on; intermittent setting activated, high windshield wiper setting activated, and low windshield wiper setting activated. A rain gauge 22 may be used to provide a estimate of rainfall and may be operational to provide an accurate reading regardless of whether the vehicle is turned on or off during the rain or precipitation. The rain gauge 22 may be reset (e.g., purged or drained by an servomotor operated valve) on a daily log kept, for example. The daily log may be recorded over an extended period and preserved at least until successful transmission from the transmitter 44 to receiver 46. If the vehicle is not equipped with a rain gauge 22, the windshield wiper state sensor 20 may provide the following: (a) a crude indication of whether precipitation is present (e.g., at least when the vehicle happens to be on during the rain and when the wiper blades are activated by the driver in response to the rain) and (b) the rate of rain or estimated rainfall range may be based on a timer (associated with the windshield wiper state sensor 20) that times the duration in which the windshield wiper remains on and the respective rate of the wind shield wiper movement (e.g., high, intermittent, or low) during corresponding time periods.

Spatial variation in the rainfall may be estimated by looking at vehicle speed and wiper setting of windshield wipers. Vehicle speed reduction versus posted vehicle speed may indicate heavy rain-fall; particularly where the wiper setting is on "high" during such reduction in vehicle speed. The relative amounts of rain indicated by the windshield wiper settings versus corresponding location data for vehicles may be referenced actual measured rainfall at specific locations to yield estimates of actual rainfall versus geographic location.

The thermometer 12 may comprise a pyrometer for measuring an external temperature or ambient temperature outside the vehicle. The humidity sensor 14 may sense the relative humidity in the ambient air outside the vehicle (or in the engine compartment) or the dew point temperature outside the vehicle. The thermometer 12 and humidity sensor 14 may be present in many vehicles, such as newer automobiles or automobiles with climate control or advanced fuel injection or carburetion systems.

The solar radiation sensor 16 may provide a solar intensity reading versus time on an on-going basis for the vehicle. Tree canopies, parking garages, buildings and other structures may detract from the accuracy of the solar intensity readings, unless the readings are correlated to locations where such parking garages, tree canopies are absent. In one embodiment, the solar radiation sensor 16 comprises a photovoltaic cell, a solar cell, a photovoltaic array, or a solar cell array. The solar radiation sensor 16 converts sunlight into direct current electricity, which can be used to estimate the intensity of solar radiation incident thereon and to operate the other sensors when the vehicle is in the off state. The current and power output of a photovoltaic cell of a given surface area is proportional to the intensity of the sunlight striking the surface area of the photovoltaic cell. An ammeter or current meter may sample the output of the solar radiation sensor 16 regularly or a periodic intervals during daylight. The solar radiation sensor 16 is outputted into a known load and each current measurement recorded is associated with corresponding location data and temporal data for the vehicle.

In an alternate embodiment, where the output of a solar radiation sensor 16 is not available or if the solar radiation sensor 16 is not present, sunlight or solar intensity may be estimated as described in this paragraph. Sunlight passing through vehicle windows or incident on the exterior body of the vehicle (e.g., especially dark) body panels, heats up the interior or cockpit of the vehicle. During the summer, for instance, this solar heating may impact air-conditioner load. For certain air conditioners, the air-conditioner load is indicated by the electrical power or current consumption of an electrical motor that drives the compressor. However, for belt-driven compressors, the load may be measured by thermal sensors located on the compressor or the amount of time that the electromagnetic air-conditioner clutch is engaged versus not engaged when the air conditioner is turned on. From the date/time/location stamp provided by the location-determining receiver 30, the location of the sun in the sky can be determined with respect to the vehicle and its direction of travel. By measuring the exterior temperature outside the vehicle, the interior temperature inside the vehicle, the air-conditioner load, and considering a thermal loading coefficient for a corresponding vehicle (e.g., based on body color, body style, model, manufacturer and year), the intensity of the sunlight (or obscuring of the sun by clouds or other environmental conditions) incident on the vehicle can be estimated.

Temperature and humidity data may be available from sensors present on the vehicle for engine control. If the temperature and humidity control are located in the engine compartment, the temperature and humidity may be compensated for the thermal effects of engine or other components.

In sum, the sensors 11 collect environmental data that comprises one or more of the following: exterior air temperature, humidity, climatic data, temperature data, dew point temperature, relative humidity, wind speed, solar radiation, sunlight intensity, wind direction, and rainfall amounts. The collected environmental data may be derived from one or more of the following precursor data items: exterior air temperature, humidity, vehicle speed and heading, interior air or cabin temperature, air conditioner setting, fuel consumption, and windshield wiper and speed setting. In one embodiment, a data derivation unit is associated with the data processor 32 for deriving collected environmental data from the precursor data items.

In one embodiment, an estimator 50 applies an evapotranspiration model (e.g. in accordance with the Penman-Monteith system) as the agronomic model. Evapotranspiration refers to an estimate of the total amount of water required to grow a crop or other plants. The total amount of water includes for example, rain water and irrigation. Evapotranspiration considers evaporation of water from the soil and transpiration of water by plants. The evapotranspiration varies from crop to a crop and at the stage of growth of a particular crop. Evapotranspiration may determined with reference to a reference plant and then multiplied by a first coefficient associated with a particular crop, and a second coefficient associated with the stage of growth (e.g., period between the planting date and present date) of such particular crop. The grower provides supplemental data on the identity of the crop, planting date, current date and crop stage, whereas the sensors 11 provide the environmental data for input to the evapotranspiration model. The evapotranspiration, the crop identifier, and the crop stage of growth (or date) are applied to provide a prescription for water input on a georeferenced basis. The evapotranspiration may be determined with reference to a standardized Penman-Monteith method, although other calculation method or procedures are equally valid and acceptable. In one example, the following collected environmental data and supplemental data forms input to the evapotranspiration determination: minimum temperature, maximum temperature, relative humidity (percentage), solar radiation (Energy/surface area), rainfall, day (e.g., A.M.) wind speed (e.g., miles per hour), and night (P.M.) wind speed, and location data.

The vehicle is associated with operation on at least one of a road, a highway, a rail line, and a transportation route adjacent to or near or in a field where a crop is present. Although vehicle electronics 10 is shown as a single vehicle in FIG. 1 for exemplary purposes, the configuration of FIG. 1 may be extended to multiple vehicles such that the environmental data represents a compilation of information from multiple vehicles with corresponding vehicular electronics 10. At the data processing system 48, statistical analysis and filters may be applied to remove outlying data, to weight data, or to assign confidence levels of intervals for different geographic areas based on the frequency or samples, the quantity of samples, and the location data associated with the samples collected from different vehicles and locations.

Any of the following organizations or entities may incorporate the vehicle electronics 10 of FIG. 1 into vehicles (e.g., on-road vehicles, off-road vehicles, or both) for various reasons (e.g., public safety, road maintenance, snow removal, road-salt distribution, drought avoidance, crop management, or other reasons in the public interest): any state government, local government, federal government, national government, national government agency, federal governmental agency; any state police department, county police department, and city police department; any state Department of Transportation, another governmental agency or entity, a quasi-governmental organization, a grower cooperative organization, a crop insurance organization, and any crop insurance regulator or consultant. Further, the vehicle electronics 10 may be incorporated into off-road vehicles owned or leased by growers. Tractors, combines, sprayers, agricultural equipment, and other vehicles may collect environmental data during the performance of agricultural tasks in the field or in surrounding areas. For instance, members of a grower co-op that does spraying of fields of different growers may gather the environmental data and share such data with all the members of the co-op, other co-ops, governmental entities, agencies, or quasi-governmental bodies. Tractors, combines, sprayers, or other vehicles with vehicle electronics 10 may be left in the field or outdoors (when not being used to treat plants or work the soil) to gather environmental data, which is then transmitted to the data processing system 48 via the transmitter 44 and the receiver 46.

Figure 2:
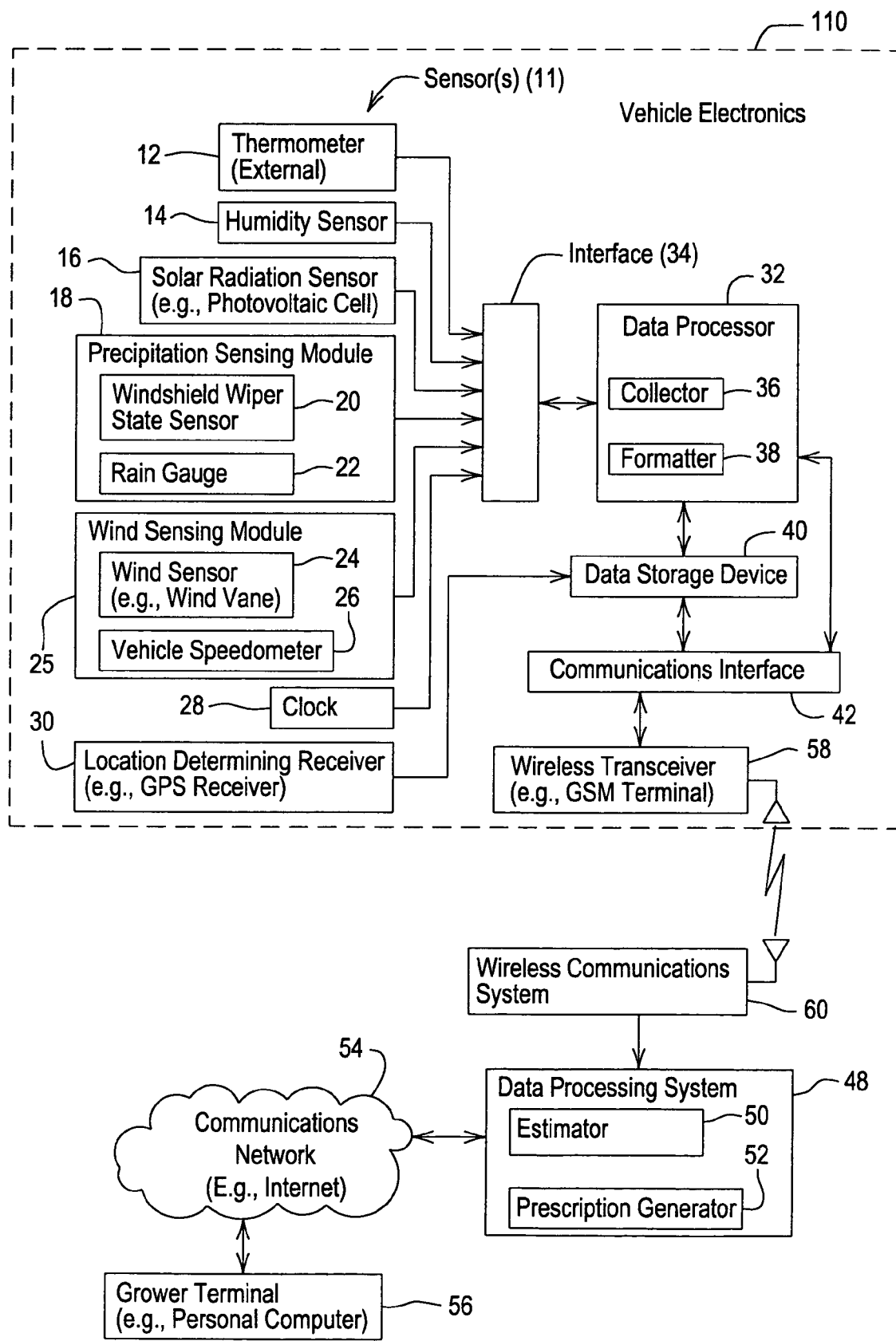
FIG. 2 is a block diagram of another embodiment of a system for estimating an agricultural management parameter in accordance with the invention.

The embodiment of FIG. 2 is similar to the embodiment of FIG. 1 except the transmitter 44 and the receiver 46 of FIG. 1 are replaced with the wireless transceiver 58 and wireless communications system 60 of FIG. 2. Like reference numbers in FIG. 1 and FIG. 2 indicate like elements.

The vehicle electronics 110 of FIG. 2 includes the wireless receiver 58 (e.g., a GSM terminal). It should be appreciated that wireless transceiver 58 and the location-determining receiver 30 may comprise an integral portion of a telematics system and may be referred to as such in common usage in the industry. The wireless communications system 60 of FIG. 2 may comprise a commercially available communications system, such as a time-division multiple-access (TDMA) system, a Global System for Mobile Communications (GSM) system, a code-division multiple-access system (CDMA), a frequency modulated system, a Personal Communications Service (PCS) system, a cellular communications system, a messaging system, an analog cellular system that supports a Cellular Digital Packet Data (CDPD), or any communications system that supports short messaging service message (SMS) or text or alphanumeric messages, or a packet data network, for example.

Telematics refers to a vehicle equipped with a communications system that interfaces with the sensors (e.g., 11) and a location-determining receiver (e.g., 30) to transmit geographically referenced sensed data via an electromagnetic signal to a remote site (e.g., a data processing system owned or used by state Department of Transportation or a police department) for processing.

Figure 3:
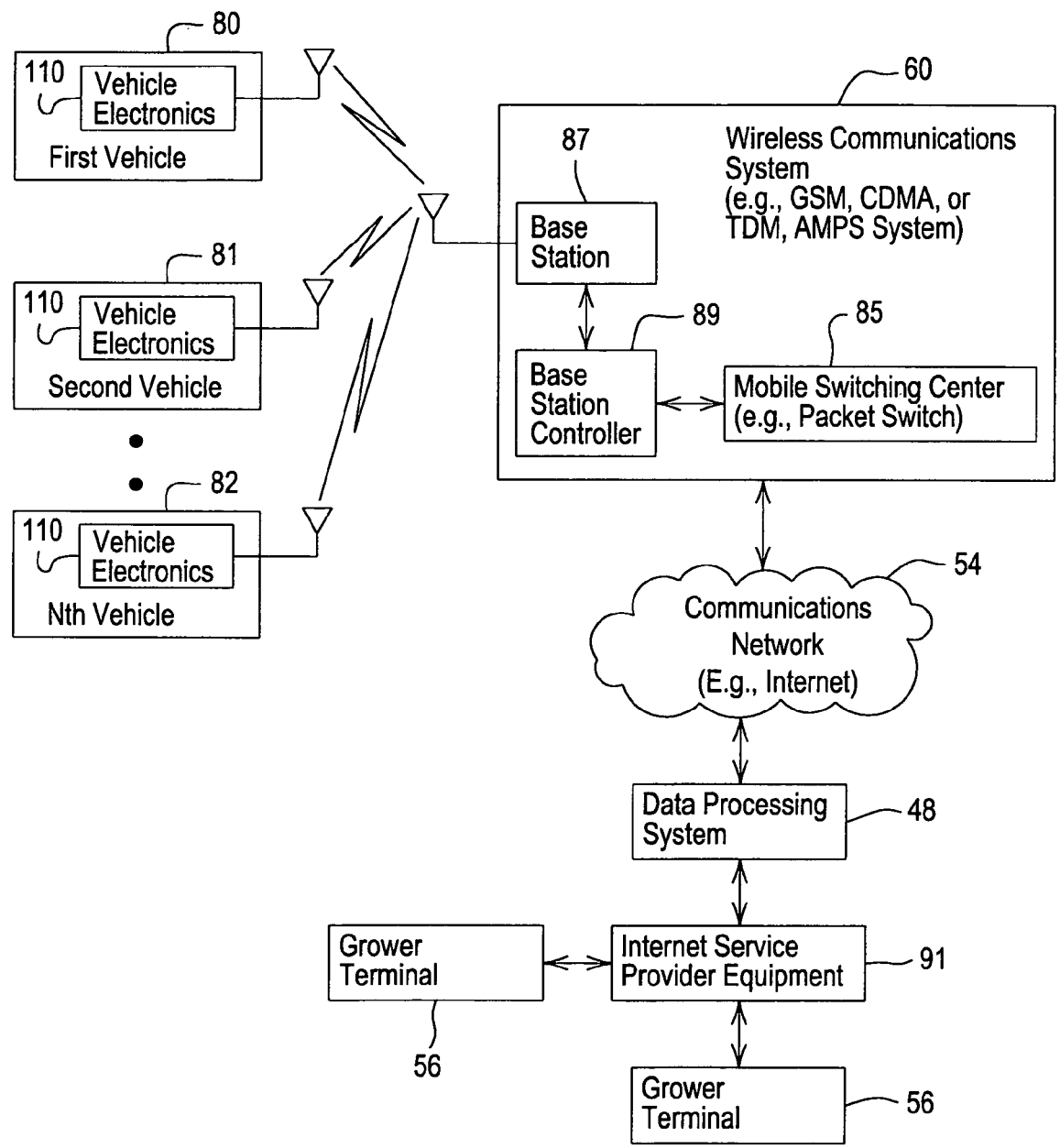
FIG. 3 is a block diagram of a system for estimating an agricultural management parameter that shows the wireless communications system in greater detail and the collection of data via multiple vehicles.

FIG. 3 shows an illustrative example of a wireless communications system 60 in greater detail than FIG. 2. Further, FIG. 3 illustrates that multiple vehicles may be equipped with vehicle electronics 110 of FIG. 2 for communication to a data processing system 48 via a wireless communications system 60. Like reference numbers in FIGS. 1, 2 and 3 indicate like elements.

In FIG. 3, the vehicles (80, 81, 82) in a geographic area may be designed as a first vehicle 80, second vehicle 81, through an Nth vehicle 82, where N equals any whole number greater than two. Although other configurations of the wireless communications system 60 are possible, in FIG. 3, the wireless communications system 60 comprises one or more base stations 87 coupled to a base station controller 89. In turn, the base station controller 89 is coupled to a mobile switching center 85. The base station 87 communicates with a transmitter or wireless transceiver 58 associated with one or more of the vehicle electronics 110. For example, each base station 87 may provide a different coverage area or service area within a geographic area and the vehicles (e.g., each vehicle) may be served by different base stations 87 (e.g., handed-off from one base station 87 to another) as they move around in a geographic area.

Via grower terminals 48, multiple growers may access a prescription generated by the data processing system 48. For instance, the grower terminals 56 may access the data processing system 48 through Internet Service Provider (ISP) equipment 91 associated with the communications network 54. Each grower may be associated with a unique location data for one or more corresponding fields and corresponding crop data for a particular crop. The prescription for each grower may be more accurate if the transportation routes or roads in a particular area are more heavily traveled with on-road vehicles equipped with vehicle electronics 110, for instance. Accordingly, the data processing system may provide a reliability level or a confidence level of the accuracy or integrity of the underlying environmental data upon which the prescription is based.

Figure 4:
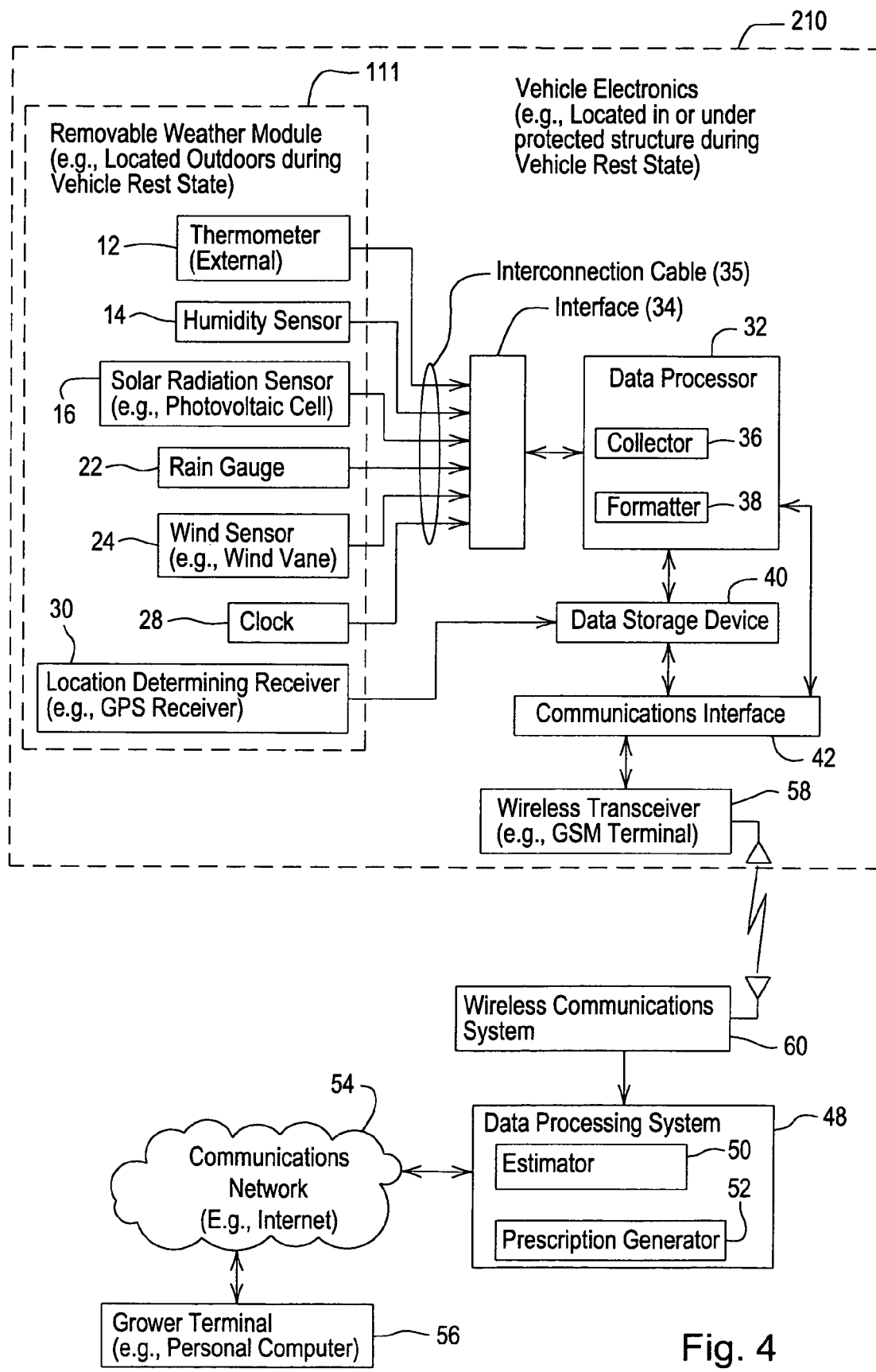
FIG. 4 is a block diagram of another embodiment of a system for estimating an agricultural management parameter where a removable weather station module is positioned outdoors and in communication with a vehicle positioned indoors during its rest state.

FIG. 4 is a block diagram of an alternate embodiment of a system for estimating an agricultural management parameter. The system of FIG. 4 is similar to the system of FIG. 2, except that the sensors 11 of FIG. 2 are replaced by a removable weather module 111. Like reference numbers in FIG. 2 and FIG. 4 indicate like elements.

In FIG. 4, the vehicle electronics 210 comprises a removable weather module 111 coupled to the interface 34 via an interconnection cable 35 or wireless link (e.g., a Blue-tooth link, an unlicensed 2.4 GHz microwave link, an infra-red link, a licensed 900 MHz, VHF or UHF communications link) to facilitate collection of environmental data when the vehicle is at rest, parked or in storage. The collected environmental data may be transmitted via telematics (e.g., including wireless transceivers 58) associated with the vehicle electronics 210. The configuration of FIG. 4 advantageously leverages the presence of telematics which may be present to service machine health or maintenance issues of the vehicle. Accordingly, the removable weather module 111 may be removed and detached from the vehicle (e.g., a tractor or agricultural work vehicle) while the vehicle is in a rest state or parked such that the vehicle may be protected from the elements by placing it in or under a protected structure (e.g., in a barn). In one embodiment, prior to use of the vehicle (e.g., to work the soil or treat crops or plants), the connection to the removable weather module 111 via the interconnection cable 35 is disconnected or the removable weather module 111 is reattached to the vehicle to collect environmental data on a mobile basis. In an alternate embodiment, where the interconnection cable 35 is replaced by a wireless link, the vehicle has complete freedom of movement without tethering the interconnection cable 35.

Figure 5:
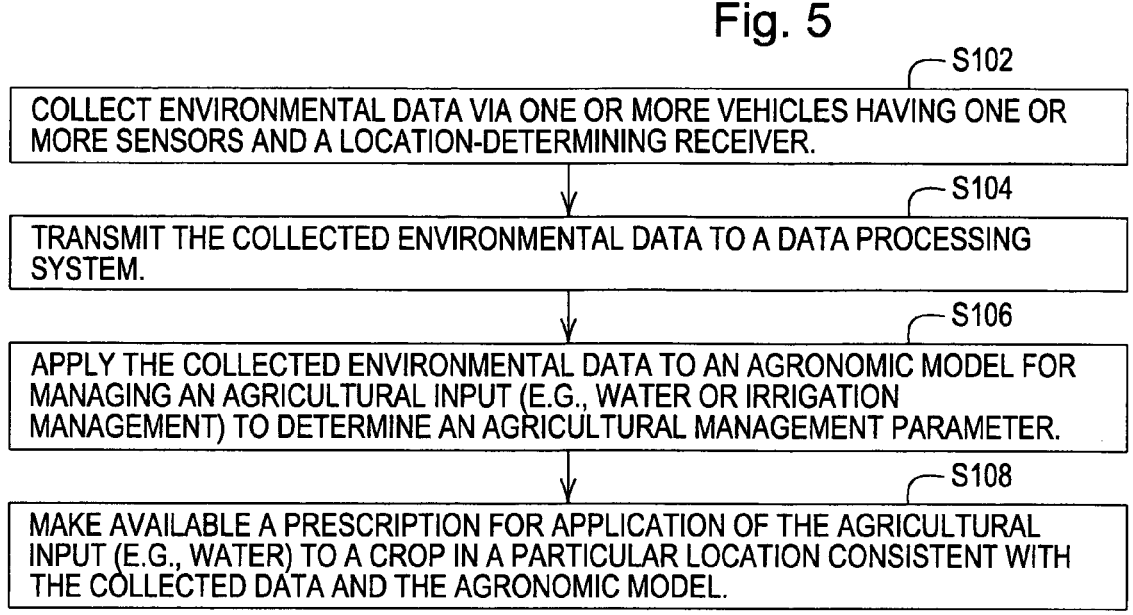
FIG. 5 is a flow chart of one embodiment of a method for estimating an agricultural management parameter in accordance with the invention.

FIG. 5 is a flow chart of a method for estimating agricultural management parameters. The method of FIG. 5 begins in step S102.

In step S102, one or more sensors 11 or removable weather module 111 collect environmental data. Environmental data includes: (a) weather data, (b) climatic data, and (c) precursor data to weather data and climatic data. Further, location data and temporal data are associated with (a) weather data, (b) climatic data, and (c) precursor data. A set of sensors 11 (or a removable weather module 111) and a location-determining receiver 30 is associated with a corresponding vehicle in a geographic area. Multiple vehicles equipped with such sensors 11 (or removable weather module 111) and location-determining receivers 30 may be present in a geographic area to collect the environmental data, although as few as a single vehicle (e.g., with vehicle electronics 10, 110, or 210) may be used to collect the environmental data and practice the invention.

Step S102 may be executed in accordance with a variety of procedures that may be applied cumulatively or alternatively. In accordance with a first procedure for executing step S102, the sensors 11 collect environmental data via one or more vehicles operating on at least one of a road, a highway, a rail line, and a transportation route. For example, the grower (or another party with consent of the grower, lease holder or land owner) may drive the on-road vehicle around roads that are adjacent to a field at regular or periodic intervals to gather environmental data on a regular basis. Collected environmental data from one or more vehicles may be organized spatially and temporally to interpolate or estimate collected environmental data in space and time for various geographic regions within the geographic area.

In accordance with a second procedure, the collected environmental data is gathered from one or more off-road vehicle equipped with vehicle electronics 10, 110 or 210. For example, the sensors 11 of vehicle (e.g., a tractor, planter, combine, harvester, or sprayer) may collect environmental data may while applying an agricultural input, planting or harvesting a crop, or performing another work task. For example, the grower (or another party with consent of the grower, lease holder or land owner) may drive the off-road vehicle around the perimeter of a field or within the field at regular or periodic intervals to gather environmental data on a regular basis.

In accordance with a third procedure, collected environmental data comprises one or more of the following: climatic data, temperature data, dew point temperature, relative humidity, wind speed, solar radiation, sunlight intensity, wind direction, and rainfall amounts. In accordance with a fourth procedure, the collected environmental data comprises one or more of the following precursor data items for deriving environmental data: exterior air temperature, humidity, vehicle speed and heading, interior air temperature, air conditioner setting, fuel consumption, windshield wiper and speed setting. In accordance with a fourth procedure, a data processor 32 associated with the sensors derives one or more of the following collected environmental data from the precursor data items: climatic data, temperature data, dew point temperature, relative humidity, wind speed, solar radiation, sunlight intensity, wind direction, and rainfall amounts.

The vehicle may have sensors 11 on board that collect data from engine, interior environmental control, and other features like lights, windshield wipers, fuel use, or otherwise. The sensor data or environmental data may be referenced to corresponding location data and time-stamped via a location-determining receiver 20, such as the Global Positioning System (GPS).

In step S104, the location data and collected environmental data are transmitted to a data processing system 48. In one example of step S104, a transmitter 44 or transceiver transmits the data via a wireless communications system 60 (e.g., a Global System for Mobile Communications (GSM) system). In another example of step S104, a transmitter 44 or transceiver transmits data (e.g., via Bluetooth or unlicensed, low power, short range transmission) to a receiver 46. The receiver 46 may comprise a wireless access point associated with a transportation route. The wireless access point may be provided by a manufacturer, distributor or dealer of agricultural equipment that is equipped to communicate with the wireless access point, for instance. In yet another example, an on-road vehicle is equipped with telematics or wireless communications which communicates the collected environmental data from the on-road vehicle to a designated wireless access point (e.g., an intersection, primary transportation route, central location within a city or town) without any intervention from the driver of the vehicle. The wireless access point may support communications range of one quarter mile or less, for example.

In step S106, the data processing system 48 applies the collected environmental data to an agronomic model for managing an agricultural input (e.g., water or irrigation management) to determine an agricultural management parameter (e.g., an evapotranspiration estimate or indicator). For example, the data processing system 48 applies the collected environmental data to an estimator 50 for estimating an evapotranspiration for a particular crop growing at a corresponding location. Although other techniques may be available, the agronomic model for water consumption may comprises a estimating evapotranspiration in accordance with the Penman-Monteith method. The evapotranspiration, the crop identifier, and the crop stage of growth (or date) are applied to provide a prescription for water input on a geo-referenced basis.

The collected environmental data may be used to estimate envirotransportation based on multiple on-road vehicles equipped with sensors and telematics, for example. To the extent the method relies on on-road collection of environmental data, it is better suited for higher populated agricultural areas such as the U.S. corn belt and in Europe, rather than sparsely populated areas like the western Dakotas and eastern Montana.

In one example for conducting step S106, additional processing may apply to the collected environmental data or the agronomic model based on: (a) feedback from previous applications of prior collected environmental data to the agronomic model, (b) machine learning techniques for successive applications of the agronomic model or (c) a priori calibration or adjustment of collected environmental data to correct for measurement errors, system errors, model estimation errors, or otherwise.

In step S108, the data processing system 48 makes available a prescription for application of an agricultural input (e.g., quantity of water, volume of water, rate, frequency of application, recommended time window of application for water) to a crop in a particular location consistent with the collected environmental data and the agronomic model. For example, the data processing system 48 transmits a prescription (e.g., for irrigation or water allocations) for a particular crop in a corresponding field to a grower terminal 56 via a communications network 54 (e.g., Internet).

Figure 6:
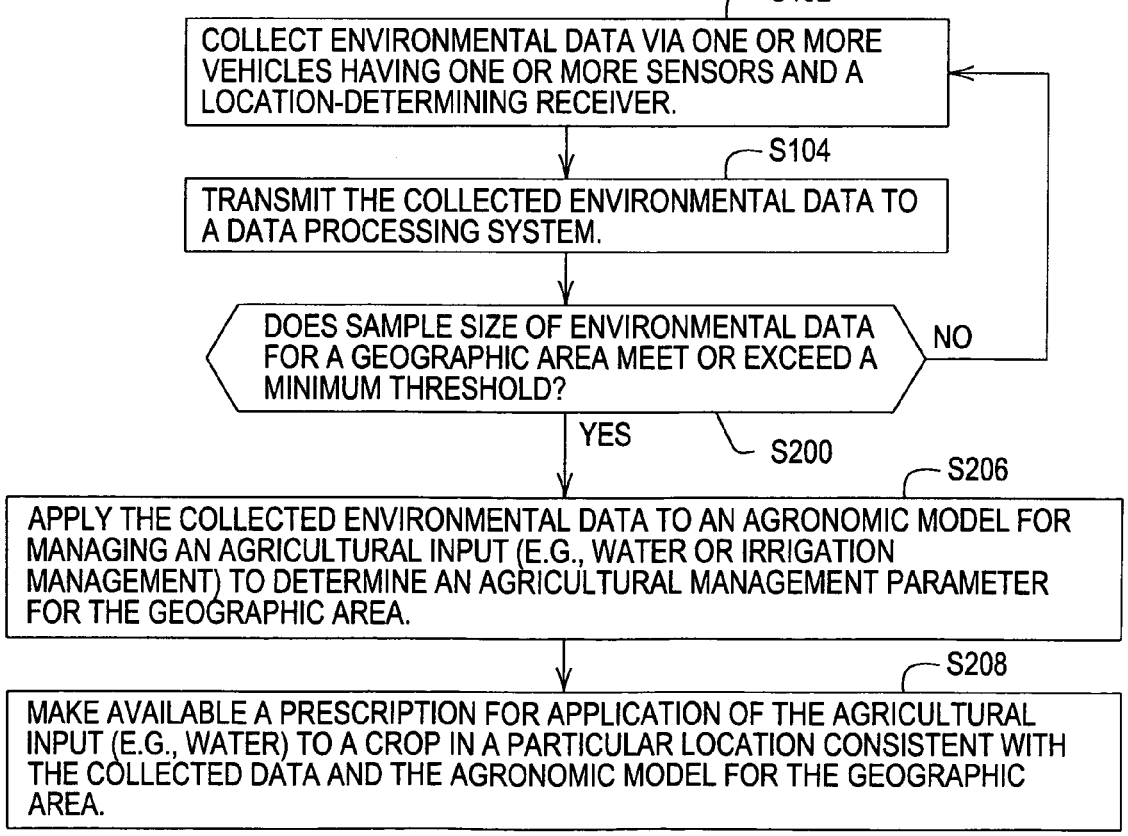
FIG. 6 is a flow chart of another embodiment of a method for estimating an agricultural management parameter in accordance with the invention.

FIG. 6 is an alternate embodiment of a method for estimating an agricultural management parameter. The method of FIG. 6 is similar to the method of FIG. 5, except the method of FIG. 6 includes a statistical filtering mechanism (e.g., step S200). Like reference numbers in FIG. 5 and FIG. 6 indicate like steps or procedures. The method of FIG. 6 begins in step S102.

Because steps S102 and S104 are identical to those of FIG. 5, here the explanation of FIG. 6 begins with step S200.

In step S200, a data processing system 48 determines if the environmental data associated with a corresponding location data within a geographic area has a sufficient quantity of samples to meet or exceed a minimum threshold sample size. If the minimum threshold sample size is met or exceeded, the method continues with step S206. However, if the minimum threshold sample size is not met or exceeded, the method returns to step S102 for additional collection of environmental data.

In step S206, the data processing system 48 applies the collected environmental data to an agronomic model for managing an agricultural input (e.g., water or irrigation management) to determine an agricultural management parameter for the geographic area.

In step S208, the data processing system 48 makes available a prescription of the agricultural input (e.g., water) to a crop in a particular location consistent with the collected data and the agronomic model for the geographic area. For example, the data processing system 48 transmits the prescription of the agricultural input or the agricultural management parameter concerning a particular crop at a corresponding location consistent with the collected data and the agronomic model for the geographic area. The prescription may be time sensitive in that it is valid for a limited time and the prescription may specify a time window for the application of certain agricultural input in accordance with a defined quantity, rate, concentration, or other defined application parameters.

FIG. 7A discloses an illustration of a potential data structure or data fields for the collected environmental data. The collected environmental data may include one or more of the following: a vehicle identifier, a vehicle location identifier, vehicle velocity data, vehicle heading data, time stamp, temperature data, humidity data, solar radiation data (e.g., solar intensity versus time data), precipitation and wind data. It is understood that the vehicle electronics (10, 110 or 210) disclosed herein may be applied to collect the foregoing environmental data. Further, any vehicle equipped with vehicle electronics may collect multiple samples along a transportation route, where each sample is uniquely identifiable by its time stamp and assigned vehicle identifier.

FIG. 7B discloses an illustration of a potential data structure or data fields for grower input data. The grower input data may include one or more of the following: a grower identifier, grower location data, crop identifier, planting date, present date, and irrigation equipment specification (optional).

FIG. 7C discloses an illustration of a potential data structure or data fields for prescription data. The prescription data may include one or more of the following: water requirement data, irrigation settings (optional), date of prescription, and time window for fulfilling prescription.

The system and method of this invention may be used with on-road vehicles (e.g., automobiles, state Department of Transportation vehicles), off-road vehicles (e.g., tractors or golf carts), or both to support the collection of environmental data (e.g., weather data). The system and method of this invention may be supported by or leveraged by telematics infrastructure supported by auto manufacturers, governmental entities, or others to gather weather data with sufficient spatial and temporal resolution for application to certain agronomic models. It is anticipated that the existing telematics infrastructure or existing wireless communications systems will lower the costs of collecting such information in comparison to a network of weather stations placed in a single field.

Having described the preferred embodiment, it will become apparent that various modifications can be made without departing from the scope of the invention as defined in the accompanying claims. For example, in any of the embodiments disclosed herein the location determining receiver 30 may be coupled to the interface 34 instead of the data storage device 40, and such modification shall fall within the scope of the claims appended hereto.

The invention claimed is:

1. A method for estimating an agricultural management parameter, the method comprising:
    collecting environmental data associated with at least one field for growing a crop in a particular location, where the collecting is accomplished via a removable weather module on an off-road vehicle in a mobile state while applying an agricultural input, planting, harvesting the crop, or performing another work task and via the removable weather module detached from the vehicle when the vehicle is in a rest state, the removable weather module having one or more sensors and the vehicle associated with a location-determining receiver;
    compensating for vehicle motion in estimating wind speed data as the collected environmental data in the mobile state;
    transmitting the collected environmental data to a data processing system;
    determining whether a sample size of the collected environmental data for a geographic area meets or exceeds a minimum threshold;
    responsive to a determination that the sample size is less than the minimum threshold, collecting additional environmental data associated with the at least one field for growing the crop in the particular location, transmitting the additional environmental data to the data processing system to form a new sample size, and determining whether the new sample size meets or exceeds a minimum threshold;
    responsive to a determination that at least one of the sample size and the new sample size meets or exceeds the minimum threshold, applying the collected environmental data to an agronomic model for estimating an agricultural management parameter for the geographic area, where the agronomic model comprises evapotranspiration for the crop; and
    making available a prescription for application of an agricultural input to a crop in the particular location consistent with the collected environmental data and the agronomic model.

2. The method according to claim 1 wherein the collecting data comprises collecting data via one or more vehicles operating on at least one of a road, a highway, a rail line, and a transportation route.

3. The method according to claim 1 wherein the removable weather module is located outdoors and the off-road vehicle is located within or under a shelter.

4. The method according to claim 1 wherein the transmitting comprises transmitting the data via a wireless communications system.

5. The method according to claim 1 wherein the transmitting comprises transmitting data via a wireless access point associated with or located along a transportation route.

6. The method according to claim 1 wherein the collected environmental data comprises one or more of the following in addition to the wind speed data: climatic data, temperature data, dew point temperature, relative humidity, solar radiation, sunlight intensity, wind direction, and rainfall amounts.

7. The method according to claim 1 wherein the collected environmental data comprises one or more of the following precursor data items: exterior air temperature, humidity, vehicle speed and heading, interior air temperature, air conditioner setting, fuel consumption, windshield wiper and speed setting.

8. The method according to claim 7 further comprising:
deriving one or more of the following collected environmental data from the precursor data items: climatic data, temperature data, dew point temperature, relative humidity, wind speed, solar radiation, sunlight intensity, wind direction, and rainfall amounts.

9. The method according to claim 1 wherein the agronomic model comprises estimating water requirements for the crop, the agricultural input comprising irrigation water.

10. The method according to claim 1 wherein the evapotranspiration, the crop identifier, and the crop stage of growth or planting date are applied to provide the prescription for water input, as the agricultural input, with reference to the location date within the field.

11. The method according to claim 1 further comprising:
detecting whether precipitation is present when a vehicle is on via a precipitation sensing module, wherein the precipitation sensing module includes a windshield wiper sensor and a rain gauge.

12. The method according to claim 1 further comprising:
estimating a rainfall range using a precipitation sensing module, wherein the precipitation sensing module estimates the rainfall range based on a duration in which a windshield wiper remains on, the respective rate of the windshield wiper movement during the corresponding duration, and a rain gauge, the environmental data comprising the rainfall range.

13. The method according to claim 12 further comprising:
referencing the estimated rainfall range to actual measured rainfall at specific corresponding locations to yield estimates of actual rainfall versus geographic location associated with multiple vehicles.

* * * * *